United States Patent [19]

Hull et al.

[11] Patent Number: 5,201,543
[45] Date of Patent: Apr. 13, 1993

[54] STEERING WHEEL PROTECTIVE CUSHION

[76] Inventors: Harold L. Hull, 401 Canyon Way #43, Sparks, Nev. 89434; William A. Young, 2200 Hudson Dr., Carson City, Nev. 89701

[21] Appl. No.: 820,137

[22] Filed: Jan. 13, 1992

[51] Int. Cl.$^5$ .............................................. B60R 21/05
[52] U.S. Cl. .................... 280/750; 280/731; 74/552
[58] Field of Search ............... 280/728, 729, 731, 750, 280/751, 753; 74/552

[56] References Cited

U.S. PATENT DOCUMENTS

| 2,784,006 | 3/1957 | Dye et al. | 280/750 |
|---|---|---|---|
| 2,866,357 | 12/1958 | Houghtaling | 72/552 |
| 3,189,367 | 6/1965 | Glass | 280/750 |
| 3,493,244 | 2/1970 | Bozich | 280/750 |
| 3,608,964 | 9/1971 | Thad | 297/397 |
| 3,643,971 | 2/1972 | Kushnick | 280/732 |
| 3,799,576 | 3/1974 | Fiala | 280/731 |
| 4,032,175 | 6/1977 | Aibe et al. | 280/751 |
| 4,287,621 | 9/1987 | Kertz | 280/750 |
| 4,440,443 | 4/1984 | Nordskog | 297/397 |
| 4,828,287 | 5/1989 | Siler | 280/751 |
| 4,944,529 | 7/1990 | Backhaus | 280/743 |
| 5,114,181 | 5/1992 | Songer | 280/750 |

Primary Examiner—Kenneth R. Rice

[57] ABSTRACT

A cushion or pillow adapted to the steering wheel of a vehicle which is removably attached and which allows the driver safe access to the steering wheel and does not impair his frontal vision or his use of the horn and still allows a view of the instrument panel. Herein shown is a preferred embodiment which is inflatable and deflatable and a second embodiment which does not require inflation with either embodiment being used in conjunction with/without a prior art "air bag".

4 Claims, 3 Drawing Sheets

STEERING WHEEL PROTECTIVE CUSHION

FIELD OF THE INVENTION

This invention relates to protective cushions or air-bags and more particularly to a cushion or air-bag associated with the steering wheel of a vehicle.

BACKGROUND OF THE INVENTION

A number of safety devices for use in vehicles to protect vehicle occupants in the event of a collision are known and well documented in prior art. The most widely excepted and used are seat belts or shoulder belts which have saved many lives principally by keeping the occupants from being thrown about inside the vehicle or being thrown out of the vehicle, however, the typical seat belt does not protect the driver from coming into contact with the steering wheel.

In recent years apparatus has been developed which upon pressurized activation is propelled towards an occupant of the vehicle to prevent the occupant from striking the structure of the vehicle in the event of a collision such as the well known "air-bag" protection device U.S. Pat. No. 3,799,576. The typical air-bag apparatus comprises an inflatable, elastic container having little or no permeability to gas which at the instant of collision is explosively filled with a gaseous mixture by means of a suitable releasing arrangement. In its rest position the air-bag is placed in tightly folded condition in a suitable container in the vehicle in front of the occupant it is designed to protect. In order to perform its function the air-bag must be inflated within a few fractions of a second of the initial collisional impact, and inflation in such a short period of time generally causes a sound in the vehicle corresponding to the decible levels produced by detonation of a shotgun blast. Such sound levels commonly cause damage to the eardrums of the occupants in the vehicle. Another disadvantage in the use of the air-bag system is the enormous increase in volume and pressure inside the vehicle when the air-bag is activated. This also affects the eardrums of the occupants of the vehicle and commonly causes damage to certain parts of the vehicle body due to the increase increase in pressure. The doors of the vehicle are sometimes deformed by the increased pressure so that they can no longer be opened after the accident has occurred thereby causing an additional safety hazard.

Also, the air-bags are triggered by a pre-set collision speed such as 15-25 M.P.H. and does not protect the driver from collision with the steering wheel at lower speeds of impact which can still cause serious injury and discomfort.

Also the air-bag is not readily reusable as it substantially fills the space in front of the driver and must be "re-loaded" by experts in the field of air-bags.

Also the typical air-bag is generally a factory item which is installed at the point of manufacture and to the knowledge of the present inventors is not an "add-on" feature.

An example of such an air cushion is the apparatus of U.S. Pat. No. 4,944,529 which teaches a cushion of substantially quadrilateral configuration and includes superposed congruent impact surfaces joined to each other along their longitudinal and lateral margins, by side surfaces folded inwardly.

All of the inflatable on contact "air-bags" rely on sensor means which senses a pre-determined collision impact of a pre-determined force or mechanical releases such as the device taught by U.S. Pat. No. 3,799,576 and the safety of the occupant depends on the reliability of many elements, any one of which may fail under actual collision conditions.

It is, therefore, desirable to provide a cushion which is made of a resilient material or is inflatable upon installation and which is affixed to the steering wheel of a vehicle which still allows for safe steering, horn button contact, visibility of the dash-board meters and unobstructed vision through the windshield and which does not depend on collision to protect the driver from the steering wheel and post and is effective even in a minor collision or sudden stop.

SUMMARY OF THE INVENTION

It is, therefore, a primary object to provide a protective cushion which may be removably installed on substantially any steering wheel and which protects the driver from direct body contact with the steering wheel.

It is another object to provide a cushion which is made of a resilient material which is combustion and flame resistant such as foam rubber to cover portions of a steering wheel.

Still another object is to design the configurations of the cushion in such a manner as to leave exposed portions of the steering wheel for proper griping of the steering wheel by both hands of the driver.

Yet another object is to provide a portion of the cushion which exposes a bottom portion of the steering wheel.

Still another important object is to provide a sloping section at the top of the cushion to allow an unobstructed frontal view.

Another object is to provide a window at a location in the cushion which allows the driver to observe the dash-board meters such as the speedometer.

Yet another object is to provide access means in the cushion to allow the driver access to the horn button.

It is still another object to provide a cushion made in the form of a bladder which is inflatable by conventional means such as an air-pump or by mouth.

Still another object is to provide an air-cushion made of material which is flexible but which is highly resistant to puncture, combustion and flames.

Another object is to provide a means to let the air out of the air cushion when necessary such as a plug.

Another important object is to provide a simple means of attachment such as by VELCRO (TM) loop and pile fastener straps or by an elastic steering wheel cover or the like.

Another object is to provide the cushion in different sizes, configurations and colors to be compatible with different models of steering wheels.

Other objects and advantages will become apparent when taken into consideration with the following drawings and specifications.

DETAILED DESCRIPTION OF THE DRAWINGS

Figure 1:
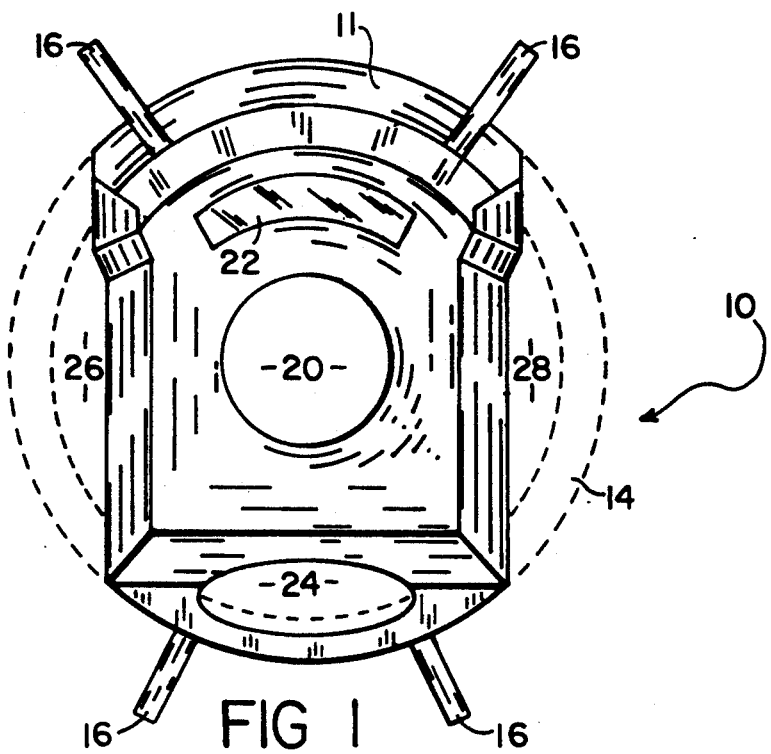
FIG. 1 is a frontal view of the preferred embodiment.
Figure 2:
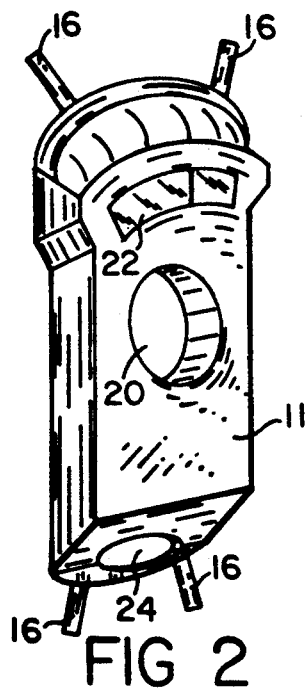
FIG. 2 is perspective view.
Figure 3:
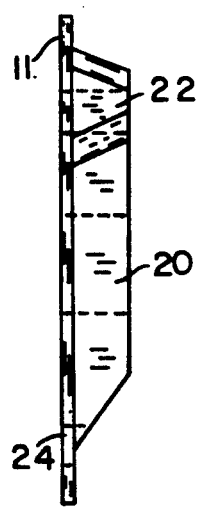
FIG. 3 is an edge view.
Figures 4, 5:
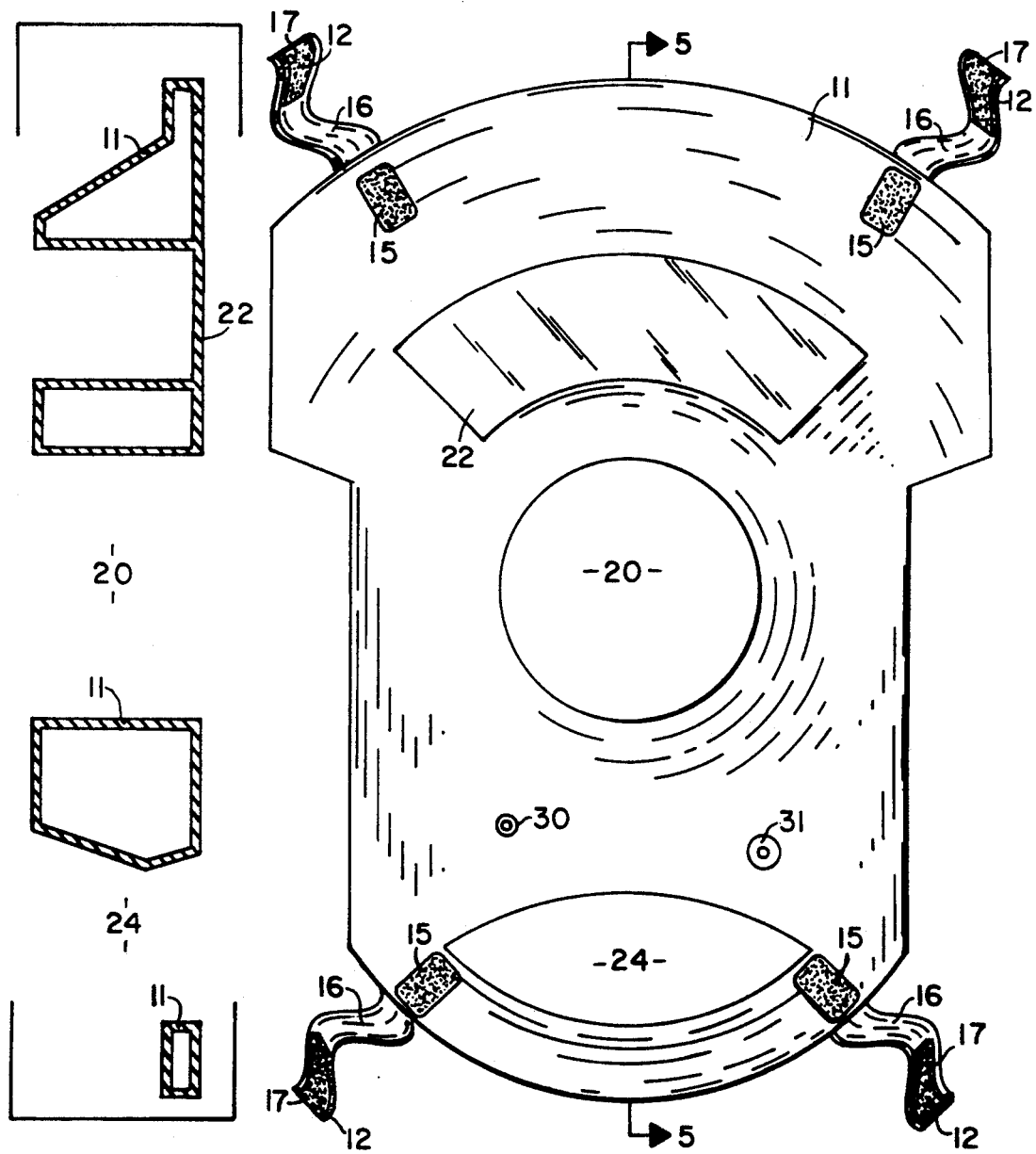
FIG. 4 is a back view.
FIG. 5 is a sectional side view taken at 5—5 of FIG. 4.

Referring now in detail to the drawings wherein like characters refer to like elements throughout the various views, 10 is an overview of the preferred embodiment as depicted in FIGS. 1-5, of a cushion or pillow 11 which is inflatable and may be made of a plastic or rubber material and can be manufactured by means such as a blow mold. The pillow or cushion 11 is removably attached on by means such as one end of VELCRO (TM) loop and pile fastener 12 affixed to straps 16 by means such as stitching 17 while being mated to the opposite end of VELCRO (TM) loop and pile fastener 15 which is suitably attached to the backside of the pillow or cushion 11 by glue or other suitable means whereby attaching the pillow or cushion 11 to the steering wheel 14 of a vehicle with the cushion or pillow 11 covering as much of the frontal area of the steering wheel as is conveniently possible without interfering with the functions of the steering wheel and does not impair visibility through the windshield of the vehicle. In the preferred embodiment the inflatable pillow or cushion is inflated by conventional means such as a bicycle pump or by mouth through valve 30 to a suitable firmness which allows the pillow or cushion 11 to protect the driver from direct contact with the steering wheel in the event of a sudden stop or collision and may be deflated by means such as a plug 31. This cushion or pillow 11 may also be used in conjunction with an inflatable "air-bag" of prior art by making the attachment means such as VELCRO (TM) loop and pile fastener a quick release which the extreme force of the "air bag" when activated disengages the pillow or cushion 11 from the steering wheel, giving even more protection to the driver.

The pillow or cushion 11 may be made in a number of configurations adaptable to different models and sizes of steering wheels and addressing the particular problems of each model such as access to the horn as shown by cavity 20 and may include a clear, transparent window section 22 through which the driver may view the instrument panel of the vehicle.

Figure 6:
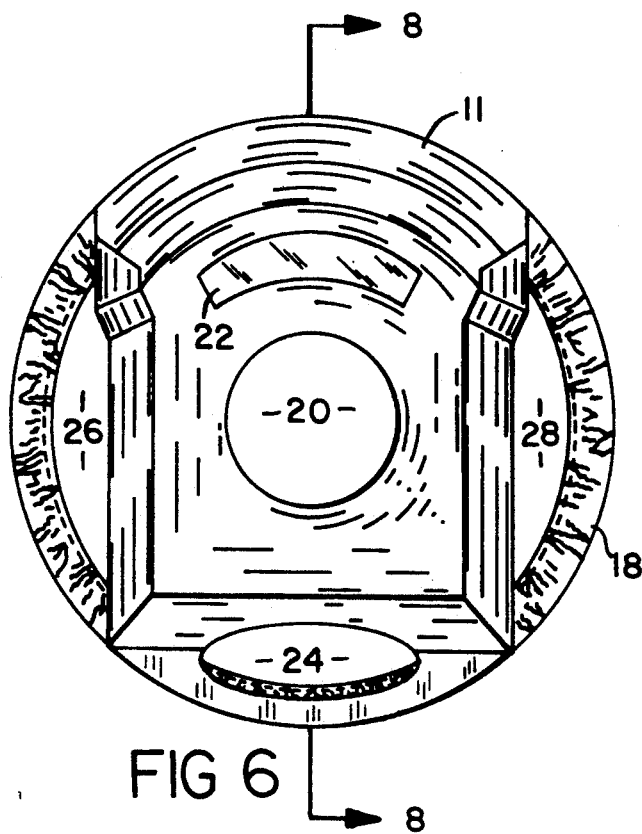
FIG. 6 is frontal view of a second embodiment, shown attached to a typical steering wheel.
Figure 8:
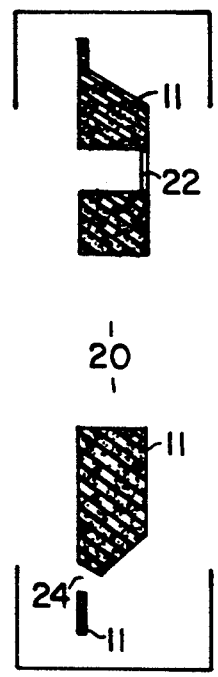
FIG. 8 is a sectional side view taken at 8—8 of FIG. 6.
Figure 7:
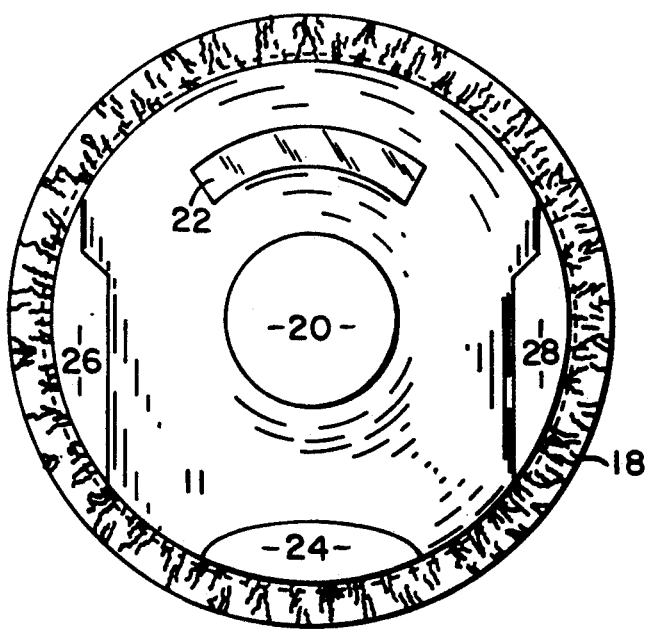
FIG. 7 is a back view of a second embodiment.

In a second embodiment as depicted in FIGS. 6-8, the cushion 11 is made of foam rubber or other sponge like material which requires no inflation and may be attached by a second means such as an elastic steering wheel cover 18 which is suitably affixed to the cushion or pillow 11 on it's back side and is affixed to the steering wheel by the conventional method of stretching the cover over the steering wheel.

Both the preferred embodiment and the second embodiment may be made with indentations exposing the steering wheel 14 at appropriate locations such as "10:00 o'clock" and "2:00 o'clock" as shown at 26 and 28, respectively and may also include a bottom indentation 24 to allow the driver to grasp the steering wheel in a comfortable manner during long stretches of driving.

It will now be seen that we have provided a cushion or pillow adapted to the steering wheel of a vehicle which is removably attached and which allows the driver safe access to the steering wheel and does not impair his frontal vision or his use of the horn and still allows a view of the instrument panel. We have also shown a preferred embodiment which is inflatable and deflatable and a second embodiment which does not require inflation with either embodiment being used in conjunction with/or without a prior art "air bag".

Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

Having described out invention, what we claim as new and desire to secure by letters patent is:

1. An inflatable cushion adapted to be mounted on the steering wheel of a vehicle comprising; a bladder, said bladder having air-inflating and deflating means, said cushion having removable mounting means to attach said cushion to said steering wheel, said cushion having at least one cavity and said cavity having a transparent covering.

2. The inflatable cushion of claim 1 in which said means to removably mount said cushion to said steering wheel is an elastic steering wheel cover, said cover being suitably affixed to said cushion, said cover being capable of surrounding and capturing said steering wheel.

3. The inflatable cushion of claim 2 in which said elastic steering wheel cover is of sufficient strength to hold said cushion in place on said steering wheel, yet is weak enough to be forceably released from said steering wheel when used in conjunction with an explosive air bag when said air bag is deployed.

4. The inflatable cushion of claim 1 in which said means to removably mount said cushion to said steering wheel is multiple straps with fastening means of the loop and pile variety.

* * * * *